United States Patent
Patki et al.

(10) Patent No.: US 12,128,947 B1
(45) Date of Patent: Oct. 29, 2024

(54) MODULAR STEERING COLUMN ASSEMBLY

(71) Applicant: Bendix Commercial Vehicle Systems LLC, Avon, OH (US)

(72) Inventors: Amrut A. Patki, Avon, OH (US); Carlos Henrique Ferrari Martins, Sao Paulo (BR); Andre Silva Barboza, Sao Paulo (BR); Giovanni D. Paganuchi, Sheffield, OH (US)

(73) Assignee: Bendix Commercial Vehicle Systems LLC, Avon, OH (US)

( * ) Notice: Subject to any disclaimer, the term of this patent is extended or adjusted under 35 U.S.C. 154(b) by 0 days.

(21) Appl. No.: 18/341,385

(22) Filed: Jun. 26, 2023

(51) Int. Cl.
*B62D 1/187* (2006.01)
*B62D 1/184* (2006.01)

(52) U.S. Cl.
CPC ............ *B62D 1/187* (2013.01); *B62D 1/184* (2013.01)

(58) Field of Classification Search
CPC ................................ B62D 1/187; B62D 1/184
See application file for complete search history.

(56) References Cited

U.S. PATENT DOCUMENTS

| | | | | |
|---|---|---|---|---|
| 2017/0129531 | A1* | 5/2017 | Regner | B62D 5/06 |
| 2020/0339179 | A1* | 10/2020 | Nozawa | B62D 1/192 |
| 2021/0245791 | A1* | 8/2021 | Krone | B62D 1/181 |
| 2024/0227910 | A1* | 7/2024 | Rangegowda | B62D 1/184 |

FOREIGN PATENT DOCUMENTS

| | | | |
|---|---|---|---|
| CN | 110962912 A | * | 4/2020 |
| CN | 113353143 A | * | 9/2021 |
| CN | 115432054 A | * | 12/2022 |
| CN | 116902056 A | * | 10/2023 |
| WO | WO-2008138731 A1 | * | 11/2008 |
| WO | WO-2021172865 A1 | * | 9/2021 |
| WO | 2022/253446 A1 | | 12/2022 |

* cited by examiner

*Primary Examiner* — Drew J Brown
(74) *Attorney, Agent, or Firm* — Reising Ethington P.C.

(57) ABSTRACT

A vehicle steering assembly includes a steering column mounting bracket configured to support a steering column and a vehicle body mounting bracket for attachment to the vehicle body. The assembly further includes an apparatus for mounting the steering column in the vehicle. The apparatus includes a body defining a first interface configured to receive a first plurality of fasteners coupling the steering column mounting bracket to the body in a fixed position and side brackets coupled to each side of the body in a manner permitting translational movement of the body relative to the side brackets along a first axis and rotational movement of the body relative to the side brackets about a second axis. The side brackets define a second interface configured to receive a second plurality of fasteners coupling the vehicle body mounting bracket to the side brackets.

19 Claims, 12 Drawing Sheets

MODULAR STEERING COLUMN ASSEMBLY

BACKGROUND OF THE INVENTION a. Field of the Invention

This disclosure relates to vehicle steering assemblies. In particular, this disclosure relates to a modular steering column assembly that enables use of a uniform set of components for mounting a plurality of different steering columns in a plurality of different vehicle mounting configurations.

b. Background Art

A conventional vehicle steering system includes a steering column assembly in which a steerable wheel is mounted on a steering shaft or column. The column is used to transfer steering commands input through the steering wheel by the vehicle operator/driver to a steering gear which in turn causes movement of a steering linkage used to turn vehicle wheels on each side of the vehicle.

Each vehicle generally includes a unique configuration for the steering column. Similarly, each vehicle generally includes a unique vehicle body configuration that presents unique mounting requirements for the steering column. Because each vehicle includes unique steering column and vehicle body configurations, unique components are required for each vehicle to mount the steering column within the vehicle leading to significant design and engineering costs and a large number of different parts. Conventional vehicles further provide for adjustment of the steering column to suit individual driver preferences including, for example, adjustment of the height of the steering wheel (and, therefore, the distance of the steering wheel from the driver) and adjustment of the tilt of the steering wheel (i.e., the angle of the steering wheel relative to the driver). Providing this functionality increases the overall part count and cost of the steering column assembly, further exacerbating the problems resulting from the need to support a variety of unique steering columns and vehicle body configurations.

The inventors herein have recognized a need for an apparatus for mounting a steering column in a vehicle that will minimize and/or eliminate one or more of the above-identified deficiencies.

BRIEF SUMMARY OF THE INVENTION

This disclosure relates to vehicle steering assemblies. In particular, this disclosure relates to a modular steering column assembly that enables use of a uniform set of components for mounting a plurality of different steering columns in a plurality of different vehicle mounting configurations.

One embodiment of an apparatus for mounting a steering column in a vehicle includes a body defining a first interface configured to receive a first plurality of fasteners coupling a steering column mounting bracket to the body in a fixed position. The steering column mounting bracket is configured to support the steering column. The apparatus further includes first and second side brackets coupled to either side of the body in a manner permitting translational movement of the body relative to the first and second side brackets along a first axis and rotational movement of the body relative to the first and second side brackets about a second axis. The first and second side brackets defines a second interface configured to receive a second plurality of fasteners coupling a vehicle body mounting bracket to the first and second side brackets.

Another embodiment of an apparatus for mounting a steering column in a vehicle includes a body defining first interface means for interfacing with a steering column mounting bracket to couple the steering column mounting bracket to the body in a fixed position. The steering column mounting bracket is configured to support the steering column. The apparatus further includes first and second side brackets coupled to either side of the body in a manner permitting translational movement of the body relative to the first and second side brackets along a first axis and rotational movement of the body relative to the first and second side brackets about a second axis. The first and second side brackets defines second interface means for interfacing with a vehicle body mounting bracket.

One embodiment of a steering assembly for a vehicle includes a steering column mounting bracket configured to support a steering column, a vehicle body mounting bracket and an apparatus for mounting the steering column in the vehicle. The apparatus includes a body defining a first interface configured to receive a first plurality of fasteners coupling the steering column mounting bracket to the body in a fixed position. The apparatus further includes first and second side brackets coupled to either side of the body in a manner permitting translational movement of the body relative to the first and second side brackets along a first axis and rotational movement of the body relative to the first and second side brackets about a second axis. The first and second side brackets defines a second interface configured to receive a second plurality of fasteners coupling the vehicle body mounting bracket to the first and second side brackets.

An apparatus for mounting a steering column in a vehicle and a steering assembly for a vehicle in accordance with the present teachings is advantageous relative to conventional vehicle steering systems. The apparatus and assembly enable use of a uniform set of components for mounting a plurality of different steering columns in a plurality of different vehicle mounting configurations thereby reducing design and engineering costs and part count.

The foregoing and other aspects, features, details, utilities, and advantages of the present teachings will be apparent from reading the following description and claims, and from reviewing the accompanying drawings.

DETAILED DESCRIPTION OF THE INVENTION

Figure 1:
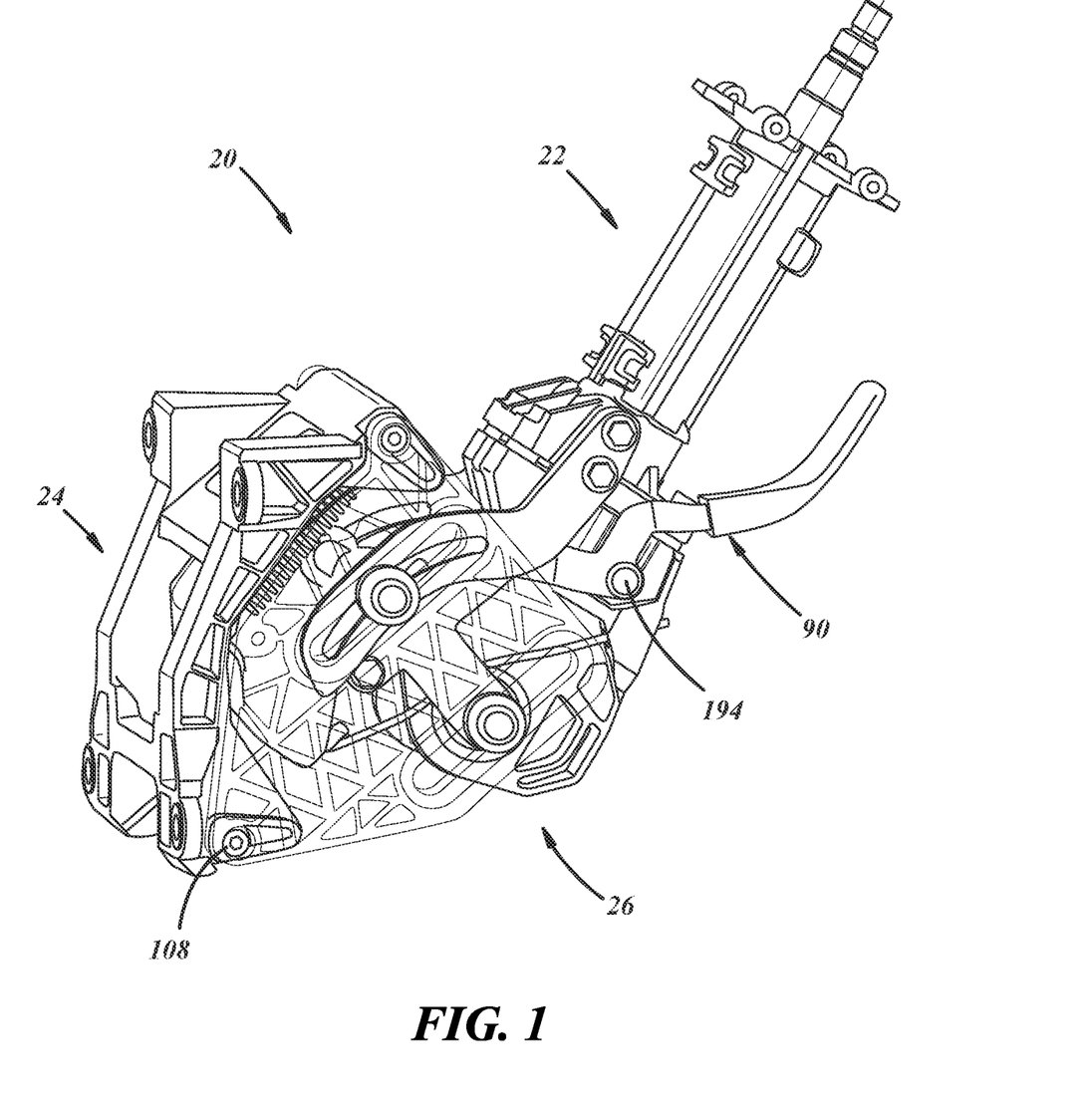
FIG. 1 is a perspective view of one embodiment of a steering assembly.
Figure 2:
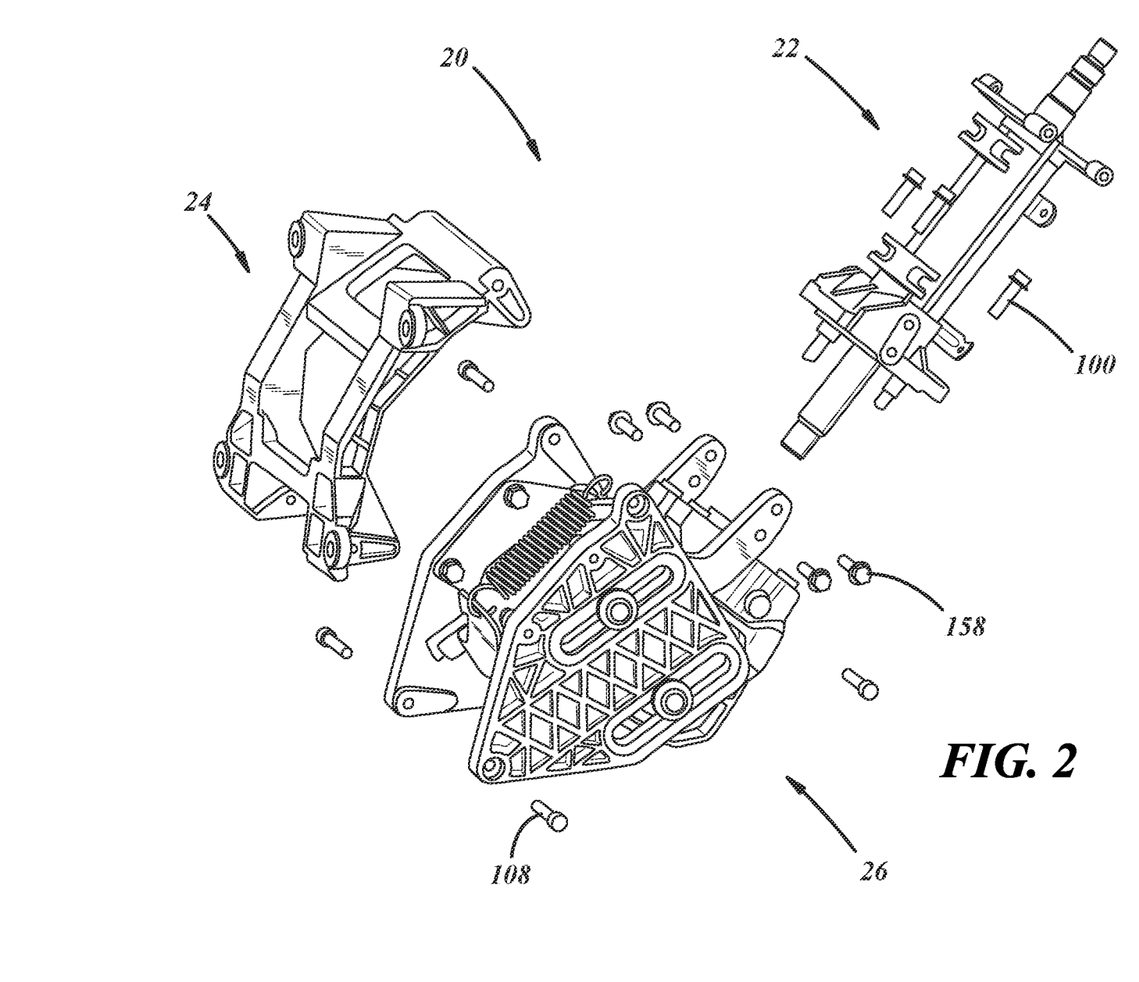
FIG. 2 is an exploded, perspective view of the steering assembly of FIG. 1.

Referring now to the drawings wherein like reference numerals are used to identify identical components in the various views, FIGS. 1-2 illustrate a steering assembly 20 for a vehicle in accordance with the present teachings. Assembly 20 provides a means for the driver to input steering forces to the vehicle to turn one or more steerable wheels on the vehicle. Assembly 20 transfers steering forces input by the driver to a steering gear which translates and augments those forces to move a steering linkage coupled to the steerable wheels. Assembly 20 may include a steering column 22, a vehicle body mounting bracket 24, and an apparatus 26 for mounting the steering column 22 in the vehicle in accordance with the teachings disclosed herein.

Figure 3:
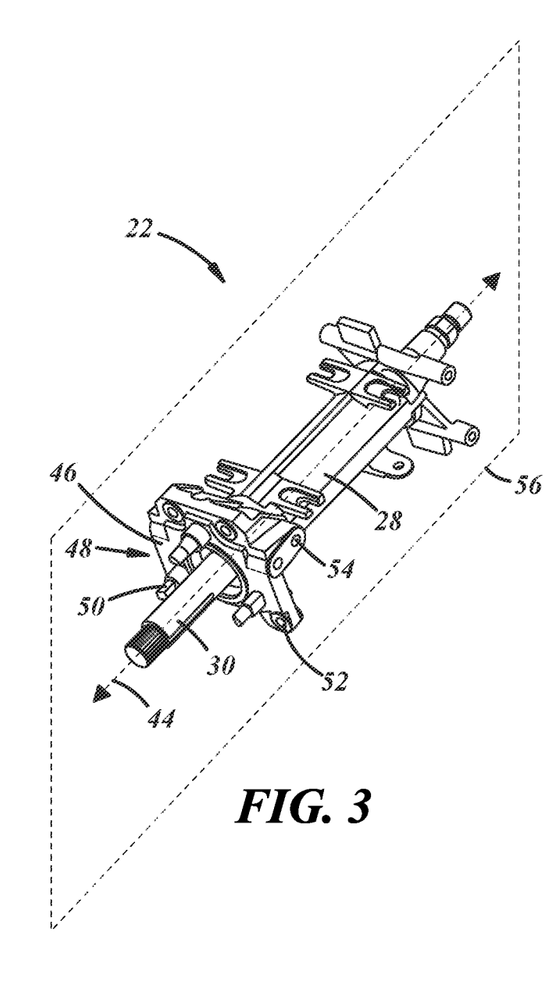
FIG. 3 is a perspective view of the steering column of the steering assembly of FIGS. 1-2.
Figure 4:
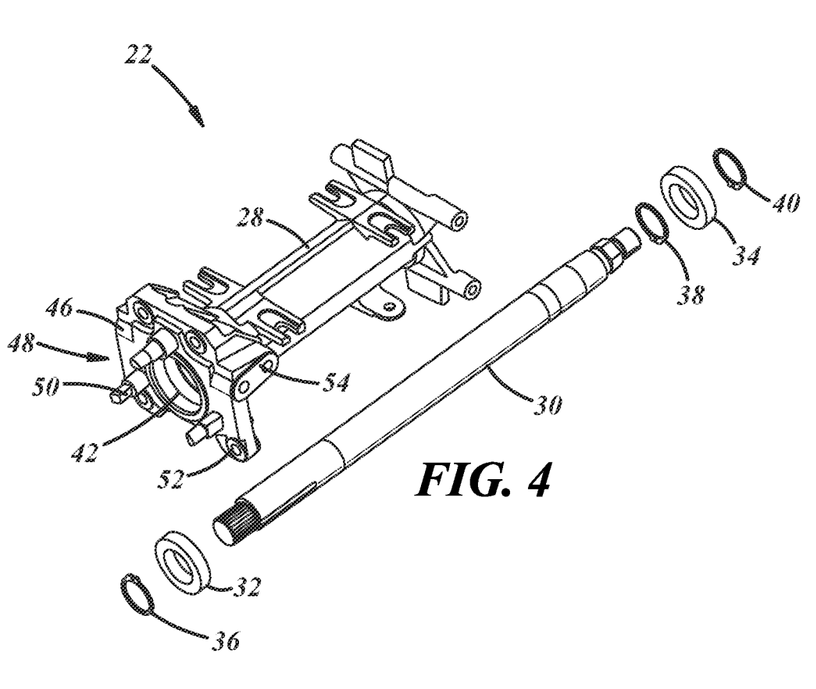
FIG. 4 is an exploded, perspective view of the steering column of FIG. 3.

Referring to FIGS. 3-4, steering column 22 provides a means for the driver to input steering forces on a steering wheel shaft 30 of column 22 and to transfer those forces to the vehicle steering gear. Column 22 may include a housing 28, a steering shaft 30 bearings 32, 34 and retainer clips 36, 38, 40.

Housing 28 positions and orients shaft 30 and other components of column 22 and protects those components from foreign objects and elements. Housing 28 defines a central bore 42 that is configured to receive shaft 30, bearings 32, 34, and retainer clips 36, 38, 40 and that may be disposed about, and centered about, a rotational axis 44 of shaft 30. In accordance with one aspect of the teachings disclosed herein, housing 28 may include a steering column mounting bracket 46 proximate one end of housing 28.

Figure 5:
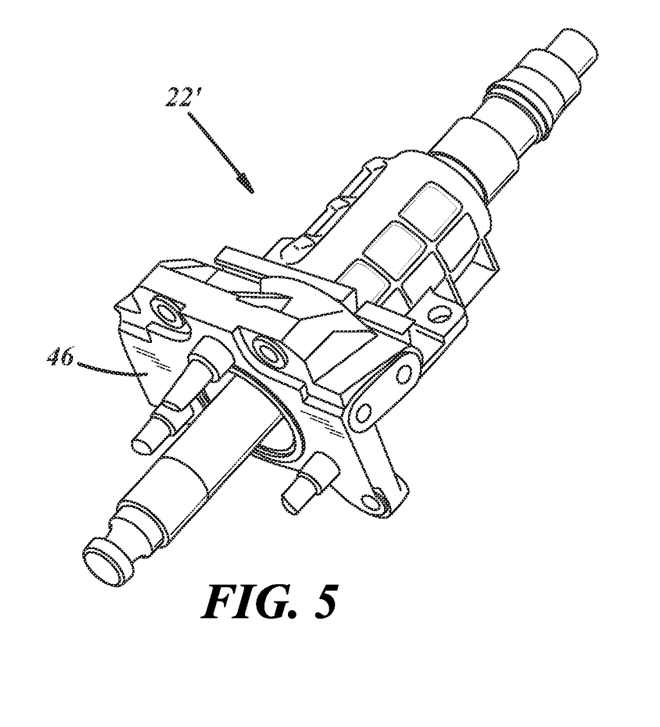
FIGS. 5-6 are perspective views of alternative embodiments of steering columns for use in the steering assembly of FIGS. 1-2.
Figure 6:
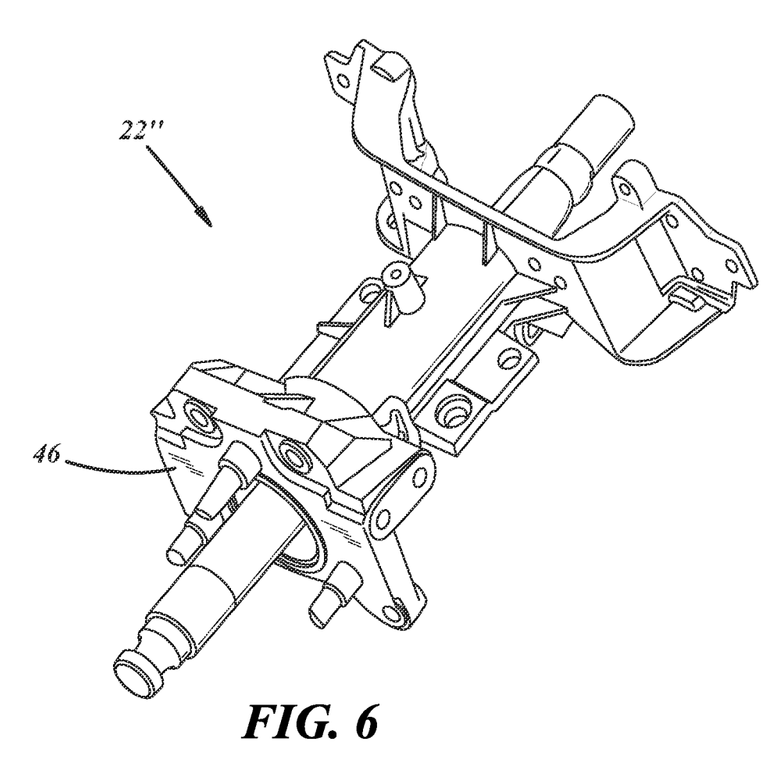

Bracket 46 may form a unitary, one-piece structure with housing 28 or may be coupled to housing 28 using conventional fasteners. Bracket 46 provides means, such as interface 48, for interfacing with apparatus 26 as discussed in more detail hereinbelow. Interface 48 may include a plurality of alignment pins 50 and pluralities of fastener bores 52, 54. Pins 50 project from bracket 46 in a direction parallel to axis 44 and to a plane 56 that contains axis 44 and extends through the front and rear of the vehicle. In the illustrated embodiment, bracket 46 includes three pins 50 arranged circumferentially about axis 44. It should be understood, however, that the number of pins 50, the location of pins 50 and the relative positioning of pins 50 may vary. Fastener bores 52 also extend in a direction parallel to axis 44 and to plane 56. In the illustrated embodiment, bracket 46 includes four fastener bores 52 arranged circumferentially about axis 44. It should be understood, however, that the number of fastener bores 52, the location of fastener bores 52 and the relative positioning of fastener bores 52 may vary. Fastener bores 54 extend in a direction perpendicular to plane 56. In the illustrated embodiment, two fastener bores 54 are disposed on either side of bracket 46 with an upper fastener bore 54 (closest to the steering wheel) disposed partially forward of the lower fastener bore 54. The upper fastener bores 54 on either side of bracket 46 may be aligned on a common axis. Similarly, the lower fastener bores 54 on either side of bracket 46 may be aligned on a common axis. It should again be understood, however, that the number of fastener bores 54, the location of fastener bores 54, and the relative positioning of fastener bore 54 may vary. Bracket 46 may be a common mounting bracket enabling connection of steering columns having a variety of different configurations to apparatus. Referring to FIG. 5-6 for example, steering columns 22' and 22" may be coupled to apparatus 26 through bracket 46 and steering columns 22, 22', 22" may therefore have a common interface for coupling to apparatus 26 thereby enabling connection of steering columns 22, 22', 22''' having a variety of different configurations to apparatus 26.

Referring again to FIGS. 3-4, steering shaft 30 transfers rotational forces input by the driver through a steering wheel (not shown) disposed at one end of shaft 30. Shaft 30 is configured for rotation about rotational axis 44. Shaft 30 may be configured at one end for connection to the steering wheel. The other end of shaft 30 may be configured for connection directly to a steering gear or, when objects in the engine compartment prevent a direct connection, to a universal joint that couples shaft 30 to another shaft connected to the steering gear.

Bearings 32, 34 are provided to allow rotation of shaft 30 relative to housing 28. Bearings 32, 34 are conventional in the art and may be disposed within bore 42 proximate either end of shaft 30.

Retainer clips 36, 38, 40 are provided to maintain the position of bearings 32, 34, relative to shaft 30. Clips 36, 38, 40 are conventional in the art and may be received within corresponding grooves in shaft 30.

Figure 7:
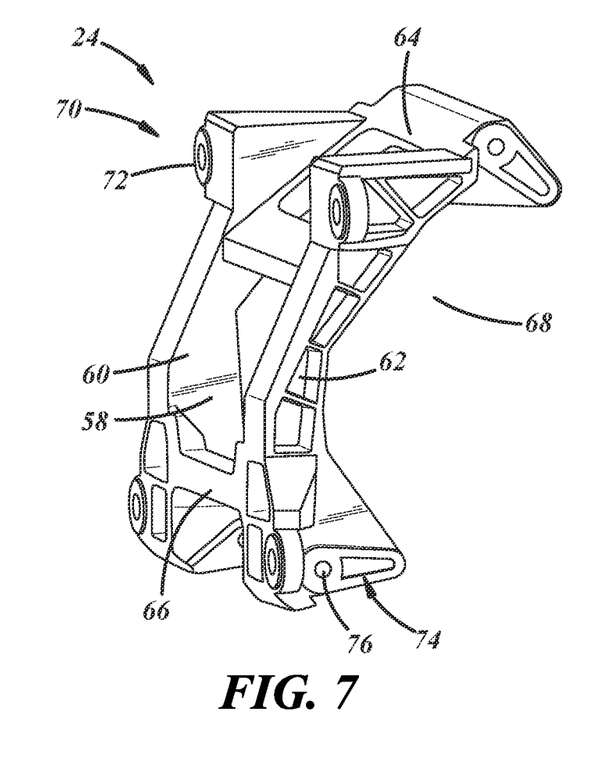
FIGS. 7-8 are perspective views of the vehicle body mounting bracket of the steering assembly of FIGS. 1-2.
Figure 8:
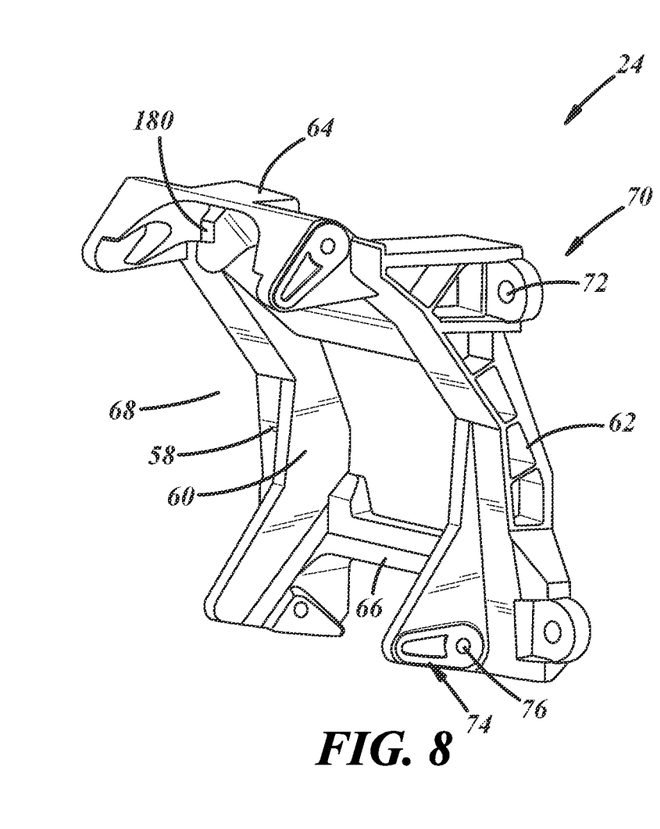
Figure 9:
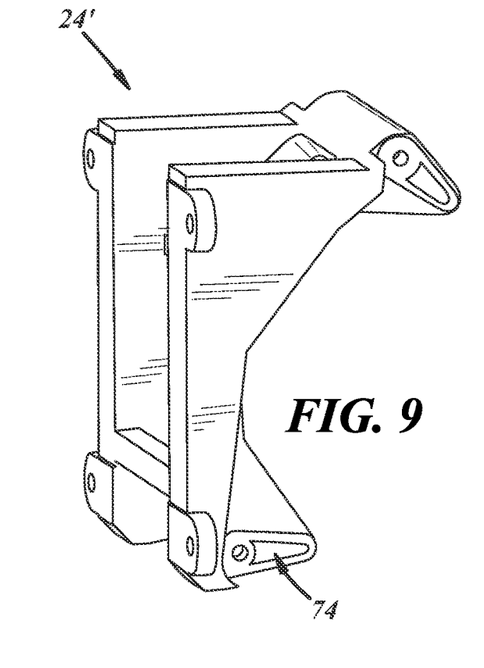
FIGS. 9-10 are perspective views of alternative embodiments of vehicle body mounting brackets for use in the steering assembly of FIGS. 1-2.
Figure 10:
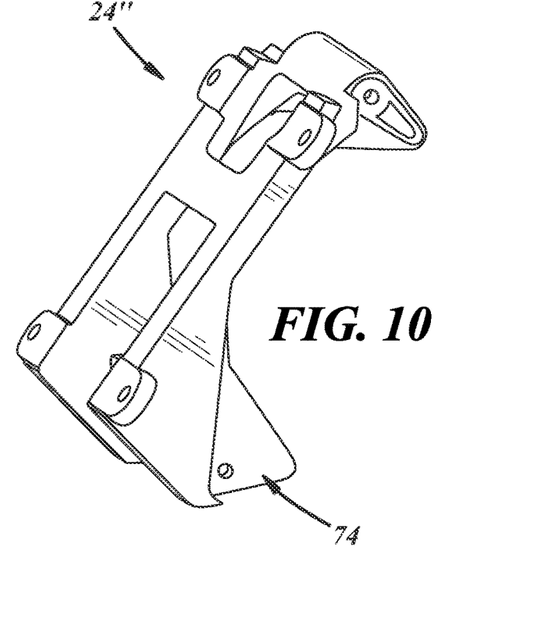

Referring now to FIGS. 7-8, vehicle body mounting bracket 24 is provided to couple apparatus 26 to the vehicle body. In the illustrated embodiment, bracket 24 is a unitary or one-piece body 58 including side portions 60, 62, and upper and lower portions 64, 66 extending between side portions 60, 62. Body 58 defines a substantially concave opening 68 configured to receive apparatus 26. Body 58 defines means, such as interface 70, for interfacing with the vehicle body. In the illustrated embodiment, interface 70 includes four fastener bores 72 with a pair of lower fastener bores 72 disposed forward of a pair of upper fastener bores 72. It should be understood, however, that the number, location and relative positioning of fastener bores 72 may vary. Body 58 also defines means, such as interface 74, for interfacing with apparatus 26. In the illustrated embodiment, interface 74 includes four fastener bores 76 with a pair of lower fastener bores 76 disposed forward of a pair of upper fastener bores 76. The lower fastener bores 76 and the upper fastener bores 76 may be aligned on parallel axes that extend in a direction perpendicular to plane 56 upon assembly of steering assembly 20. It should be understood that the configuration of bracket 24 may vary. Referring to FIGS. 9-10, for example, brackets 24', 24" may include a common interface 74 with bracket 24 for coupling brackets 24, 24', 24" to apparatus 26, but different interfaces for coupling brackets 24, 24', 24" to different vehicle bodies thereby enabling connection of vehicle body mounting brackets 24, 24' 24" having a variety of different configurations to apparatus 26.

Figure 11:
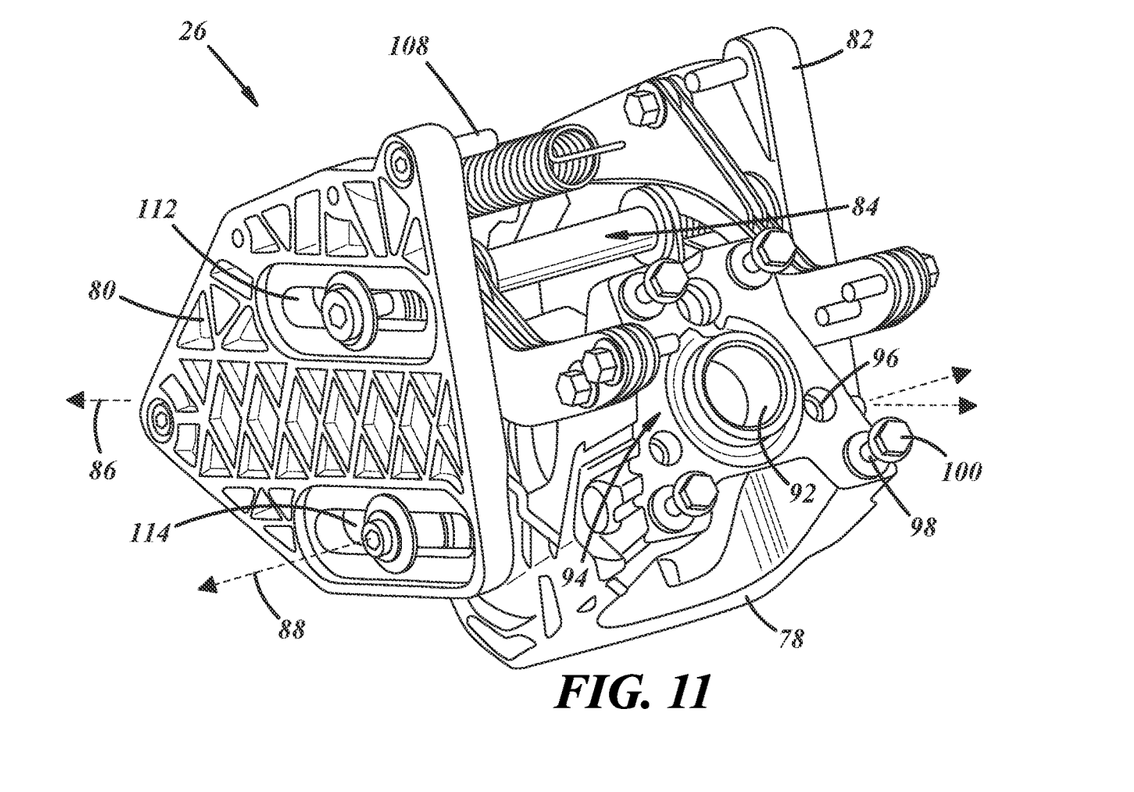
FIG. 11 is a perspective view of one embodiment of an apparatus of the steering assembly of FIGS. 1-2 for mounting a steering column in a vehicle.
Figure 12:
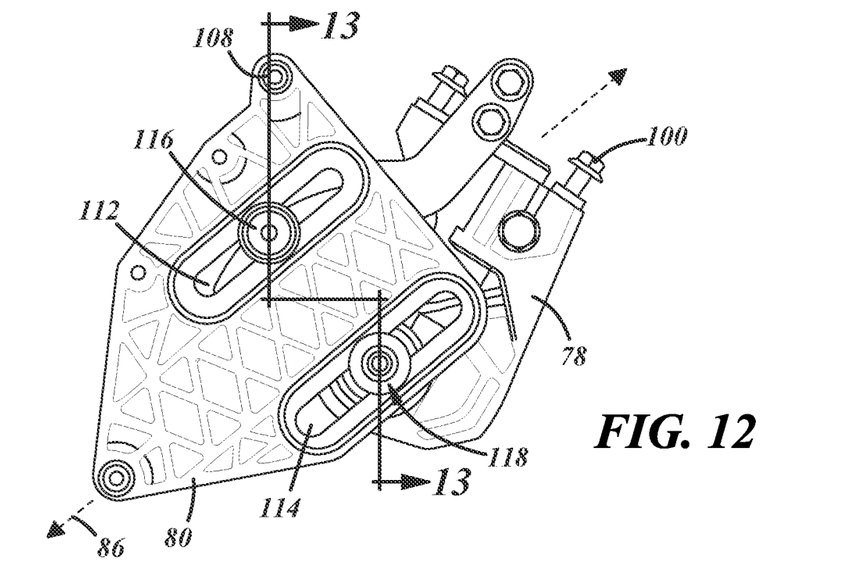
FIG. 12 is a side view of the apparatus of FIG. 11.

Referring now to FIG. 11-16, apparatus 26 is provided to mount steering column 22 (or another steering column such as column 22' or column 22") in the vehicle and to allow the driver to adjust the position of column 22 relative to the driver and other portions of the vehicle. Referring to FIG. 11, apparatus 26 may include a body 78, side brackets 80, 82, and means, such as translation and pivot mechanism 84, to enable translational or linear movement of body 78 and steering column 22 relative to side brackets 80, 82 and vehicle mounting bracket 24 along an axis 86 contained within or parallel to plane 56 (i.e., towards and away from the driver) and rotational movement of body 78 and steering column 22 relative to side brackets 80, 82 and vehicle mounting bracket 24 about an axis 88 extending perpendicular to plane 56. Referring to FIG. 1, apparatus 26 may also include means, such as position locking assembly 90, for controlling (i.e., preventing or allowing) movement of body 78 and steering column 22 relative to side brackets 80, 82 and vehicle mounting bracket 24.

Figure 14:
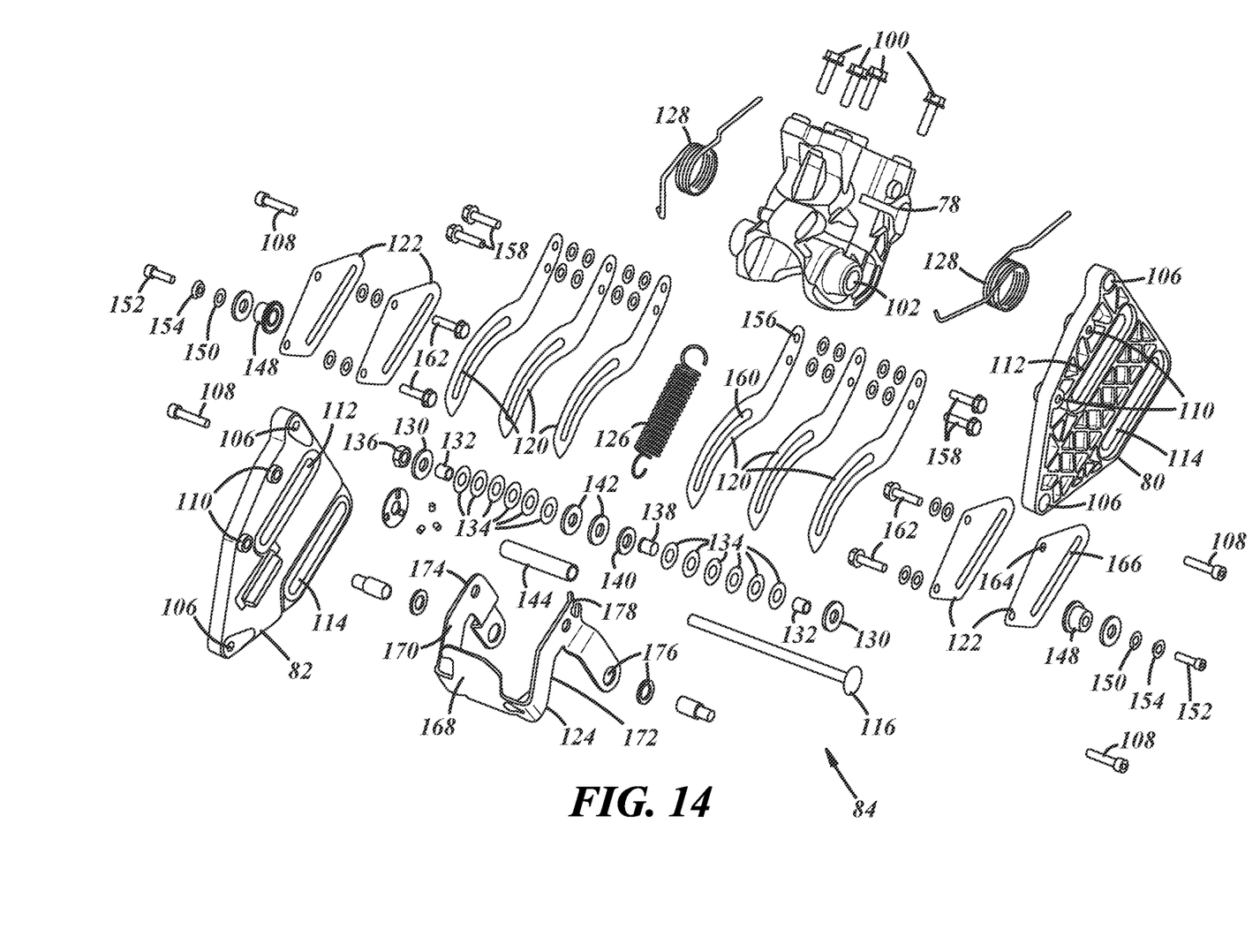
FIG. 14 is an exploded, perspective view of the apparatus of FIGS. 10-12.

Referring again to FIG. 11, body 78 is configured to receive and support steering column 22. Body 78 also provides a means for mounting, and structural support for, other components of apparatus 26. Body 78 defines a central bore 92 configured to receive one end of steering shaft 30 upon assembly of steering assembly 20. Bore 92 may therefore be aligned with bore 42 in housing 28 and may be disposed about, and centered about axis 44 upon assembly. Body 78 defines means, such as interface 94, for interfacing with steering column mounting bracket 46 and maintaining bracket 46 in a fixed position relative to body 78. Interface 94 may include a plurality of alignment pin bores 96 and a plurality of fastener bores 98. Alignment pin bores 96 are configured to receive alignment pins 50 on bracket 46 and extend in a direction parallel to axis 44 and plane 56. In the illustrated embodiment, body 78 includes three alignment pin bores 96 arranged circumferentially about axis 44. It should be understood, however, that the number of alignment pin bores 96, the location of alignment pin bores 96 and the relative positioning of alignment pin bores 96 may vary depending on the desired configuration for steering column mounting bracket 46. Fastener bores 98 are configured to received fasteners 100 used to couple bracket 46 to body 78 in a fixed position. Fastener bores 98 also extend in a direction parallel to axis 44 and to plane 56. In the illustrated embodiment, body 78 includes four fastener bores 98 arranged circumferentially about axis 44. It should again be understood, however, that the number of fastener bores 98, the location of fastener bores 98 and the relative positioning of fastener bores 98 may vary depending on the desired configuration for steering column mounting bracket 46. During assembly of steering assembly 20, one or both of steering column 22 and apparatus 26 are moved to align alignment pins 50 on bracket 46 with alignment pin bores 96 on body 78 and fastener bores 52 on bracket 46 with fastener bores 98 on body 78. Subsequently, one or both of steering column 22 and apparatus 26 are moved in a direction parallel to axis 44 and alignment pins 50 on steering column mounting bracket 46 are inserted into alignment pin bores 96 on body 78. Thereafter, fasteners 100 such as screws or bolts are inserted through fastener bores 52 in bracket 46 and into fastener bores 98 in body 78 in a direction parallel to axis 44 and plane 58. Referring to FIG. 14, body 78 further defines pivot pin receiving bores 102 on either side of body 78 extending in a direction perpendicular to plane 58 for a purpose described below.

Figure 16:
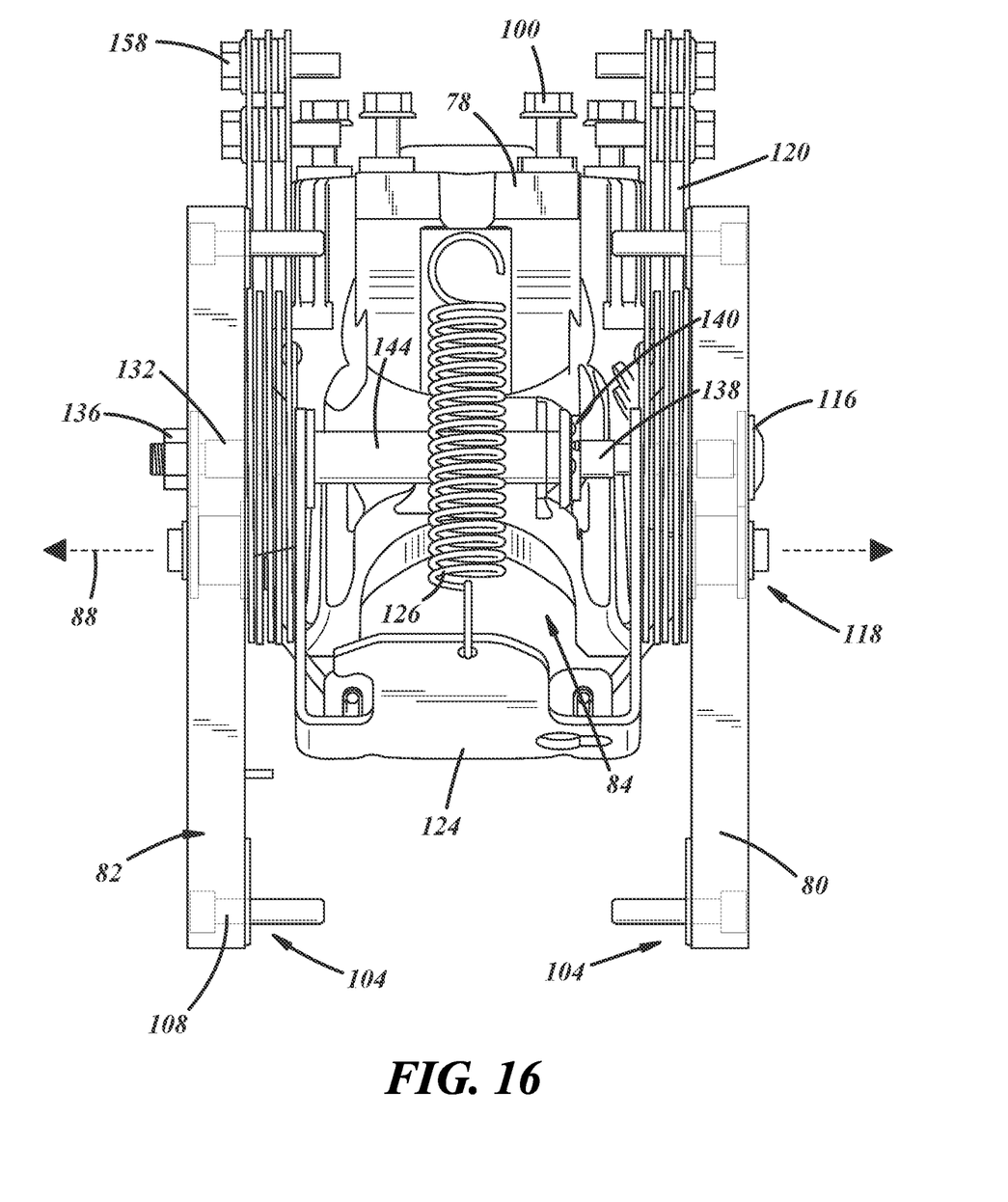
FIG. 16 is a partially transparent front view of the apparatus of FIGS. 10-15

Referring again to FIG. 1, side brackets 80, 82 couple apparatus 26 to vehicle body mounting bracket 24. Referring to FIG. 16, brackets 80, 82 include means, such as interface 104, for interfacing with vehicle body mounting bracket 24. Referring to FIG. 14, interface 104 includes a plurality of fastener bores 106 that are configured for alignment with corresponding bores 76 of interface 74 of vehicle body mounting bracket 24. In the illustrated embodiment, consistent with the configuration for vehicle mounting bracket 24, side brackets 80, 82 together include four fastener bores 106 with a pair of aligned lower fastener bore 106 disposed forward of a pair of aligned upper fastener bore 106. The lower fastener bores 106 and the upper fastener bores 106 may be aligned on parallel axes that extend in a direction perpendicular to plane 56 upon assembly of steering assembly 20. Bores 106 are configured to receive fasteners 108 such as screws or bolts extending through bores 106 in side brackets 80, 82 and into bores 76 in vehicle body mounting bracket 24. Both bores 106 in side brackets 80, 82 and, upon assembly, fasteners 108 extend in a direction perpendicular to plane 56. Fasteners 108 include a pair of upper fasteners 108 that extend through the pair of upper fastener bores 106 in side brackets 80, 82 and the upper fastener bores 76 in vehicle body mounting bracket 24 and a pair of lower fasteners 108 that extend through the pair of lower fastener bores 108 in side brackets 80, 82 and the lower fastener bores 76 in vehicle body mounting bracket 24. The upper fasteners 108 are inserted through the upper bores 106, 76 in opposite directions and are disposed about a common axis perpendicular to plane 56. Similarly, lower fasteners 108 are inserted through the lower bores 106,76, in opposite directions and are disposed about a common axis perpendicular to plane 56 and parallel to the axis of the upper fasteners 108. Referring again to FIG. 14, in addition to fastener bores 106, each side bracket 80, 82 further includes a pair of fastener bores 110 for a purpose described below.

Referring again to FIG. 11, side brackets 80, 82 are further coupled to either side of body 78 in a manner permitting translational movement of body 78 and steering column 22 relative to side brackets 80, 82 and vehicle mounting bracket 24 along axis 86 in a direction towards and away from the driver and rotational movement of body 78 and steering column 22 relative to side brackets 80, 82 and vehicle mounting bracket 24 about axis 88. Each side bracket 80, 82 includes parallel upper and lower slots 112, 114. As discussed in greater detail below, slots 112, 114 are configured to receive elements of translation and pivot mechanism 84. Slots 112, 114 are elongated in a direction moving between steering column 22 and vehicle body mounting bracket 24. The upper slots 112 in brackets 80, 82 are aligned with one another upon assembly of apparatus 26. Similarly, the lower slots 114 in brackets 80, 82 are aligned with one another upon assembly of apparatus 26.

Figure 13:
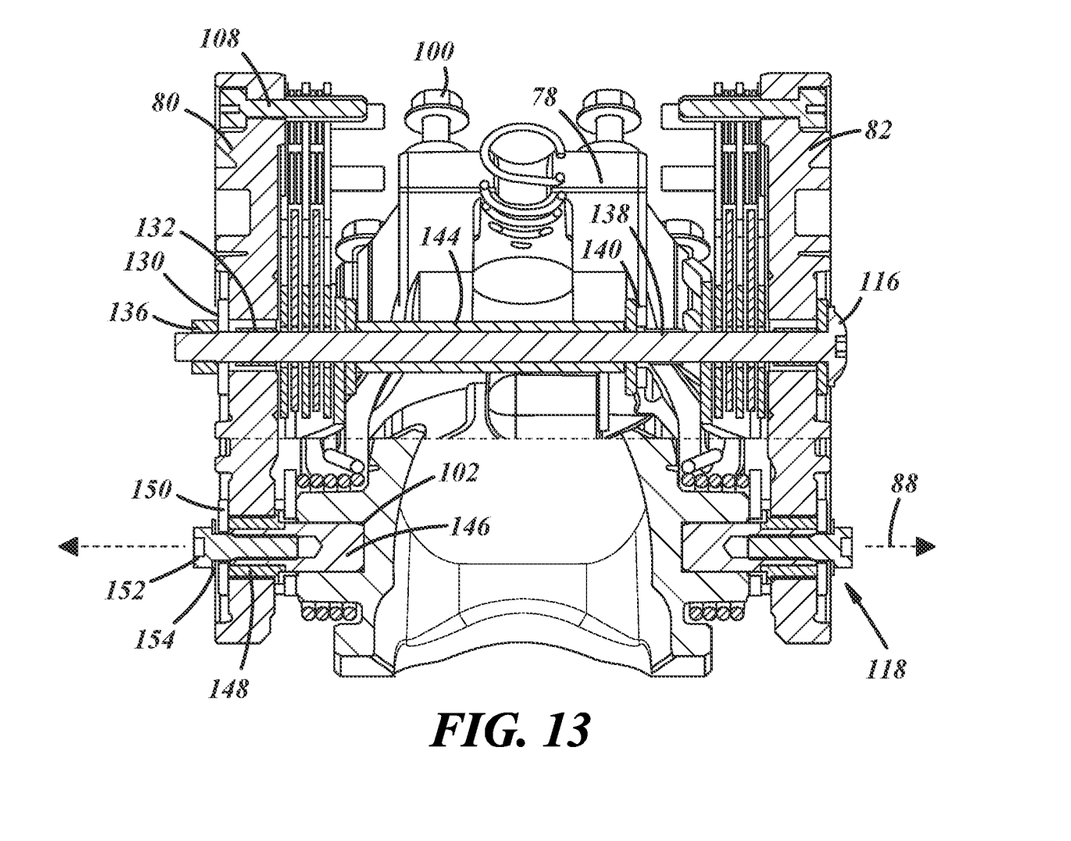
FIG. 13 is a cross-sectional view of the apparatus of FIGS. 11-12 taken along the line A-A in FIG. 12.

Translation and pivot mechanism 84 provides a means for enabling translational or linear movement of body 78 and steering column 22 relative to side brackets 80, 82 and vehicle mounting bracket 24 along axis 86 (i.e., towards and away from the driver) and rotational movement of body 78 and steering column 22 relative to side brackets 80, 82 and vehicle mounting bracket 24 about axis 88 (i.e., tilting). Referring to FIG. 13, mechanism 84 may include a positioning fastener 116 and a pivot assembly 118. Referring to FIG. 14, mechanism 84 further includes tilt plates 120, reinforcement plates 122, a spring connection plate 124, an extension spring 126, and torsion springs 128.

Positioning fastener 116 couples body 78 to side brackets 80, 82, through tilt plates 120. Fastener 116 may comprise a domed head Allen screw. Fastener 116 extends through the upper slot 112 in side bracket 80, a first set of interleaved tilt plates 120 and reinforcement plates 122 on one side of body 78, a second set of interleaved tilt plates 120 and reinforcement plates 122 on the opposite side of body 78 and the upper slot 112 in side bracket 82. Referring to FIG. 14, fastener 116 may extend through washers 130 disposed on an outboard side of each side bracket 80, 82, sleeves 132 that are disposed within upper slots 112 in side brackets 80, 82 to facilitate movement of fastener 116 along slots 112, washers 134 adjacent each side of a tilt plate 120 or reinforcement plate 122 in each set of interleaved tilt plates 120 and reinforcement plates 122, a nut 136 on an outboard side of side bracket 82. Between the two sets of tilt plates 120 and reinforcement plates 122, fastener 114 may further extend through a sleeve 138, a thrust bearing 140, washers 142 and a reinforcement tube 144. Sleeve 138 and/or tube 144 are configured to receive elements of position locking assembly 90 as discussed in more detail below.

Referring to FIG. 13, pivot assembly 118 couples body 78 to side brackets 80, 82 in a manner allowing translational movement of body 78 and steering column 22 relative to side brackets 80, 82 and vehicle mounting bracket 24 along axis 86 and rotational movement of body 78 and steering column 22 relative to side brackets 80, 82 and vehicle mounting bracket 24 about axis 88. Assembly 118 may include pivot pins 146, sleeves 148, washers 150, fasteners 152 and bushings 154. Pivot pins 146 are configured to be received within pivot pin receiving bores 102 on either side of body 78. Pivot pins 146 may be disposed about, and centered about, axis 88 and project outward from bores 102 into lower slots 112 in side brackets 80, 82. Sleeves 148 are disposed about pins 146 within lower slots 112 in side brackets 80, 82 and are retained within slots 112 by shoulders formed on pivot pins 146 and engaging the inboard ends of sleeves 148 and washers 150 disposed on the outboard sides of side brackets 80, 82 and engaging the outboard ends of sleeves 148. Each washer 150 may be held in place by fastener 152 that extends through flanged bushing 154 and washer 150 and into a closed bore in pivot pin 146. Sleeves 148 may be disposed about, and centered about, axis 88 and are configured for movement along lower slots 112 and permit translational movement of body 78 and steering column 22 relative to side brackets 80, 82 and vehicle mounting bracket 24 along axis 86 and rotational movement of body 78 and steering column 22 relative to side brackets 80, 82 and vehicle mounting bracket 24 about axis 88.

Referring again to FIG. 14, tilt plates 120 facilitate rotational movement of body 78 and steering column 22 about axis 88 relative to side brackets 80, 82 and vehicle mounting bracket 24. In the illustrated embodiment, three tilt plates 120 are disposed on either side of body 78 and interleaved with reinforcing plates 122. It should be understood, however, that the number of tilt plates 120 may vary. Each tilt plate 120 includes means, such as fastener bores 156 for interfacing with the steering column mounting bracket 46 proximate one end. Bores 156 are configured to receive fasteners 158 such as screws or bolts that extend through bores 156 in tilt plates 120 and, referring to FIG. 3, into bores 54 in bracket 46 in a direction perpendicular to plane 56. Referring again to FIG. 14, each tilt plate 120 further includes an arcuate slot 160 formed proximate another end that is configured to receive positioning fastener 116. During rotation of body 78 and steering column 22 about axis 88, tilt plates 120 will move with body 78 and steering column 22 and positioning fastener 116 will be repositioned within slots 160 in tilt plates 120.

Reinforcement plates 122 provide additional structural support to apparatus 26 and, with tilt plates 120, provide a frictional force resisting movement of body 78 and steering column 22 when position locking assembly 90 is in a locked position. Plates 122 may be coupled to side plates 80, 82 using fasteners 162 that extend through aligned bores 164, 110 in plates 122 and side brackets 80, 82, respectively. Plates 122 define a longitudinal slot 166 configured for alignment with upper slot 112 in side brackets 80, 82 and configured to receive positioning fastener 116. Reinforcement plates 122 are interleaved with tilt plates 120, but unlike tilt plates 120 remain in a fixed in position relative to side brackets 80, 82 during movement of body 78 and steering column 22 relative to side brackets 80, 82 and vehicle mounting bracket 24.

Spring connection plate 124 provides a means for mounting one end of each of springs 126, 128 used in preventing abrupt movement of steering column 22 when position locking assembly 90 is in an unlocked position. Connection plate 124 is disposed between side brackets 80, 82 and includes a body 168 and arms 170, 172 projecting from either side of body 168. Body 168 is disposed centrally between side brackets 80, 82 and is configured for connection to one end of each of springs 126, 128. Each arm 170, 172 defines a pair of bores 174, 176 configured to receive positioning fastener 116 and a corresponding pivot pin 146 of pivot assembly 118. Arm 172 further defines a means, such as interface 178, for interfacing with position locking assembly 90. In the illustrated embodiment, interface 178 includes a pair of spaced fingers that extend upward from arm 172 and then bend in an inboard direction.

Extension spring 126 is configured to prevent abrupt movement of steering column 22 along axis 86 when position locking assembly 90 is in an unlocked position and to return body 78 and steering column 22 to a default position along axis 86. Referring to FIG. 8, one end of spring 126 may be coupled to a notch 180 formed in vehicle mounting bracket 24. Referring to FIG. 16, the other end of spring 124 may be coupled to body 168 of spring connection plate 124.

Figure 15:
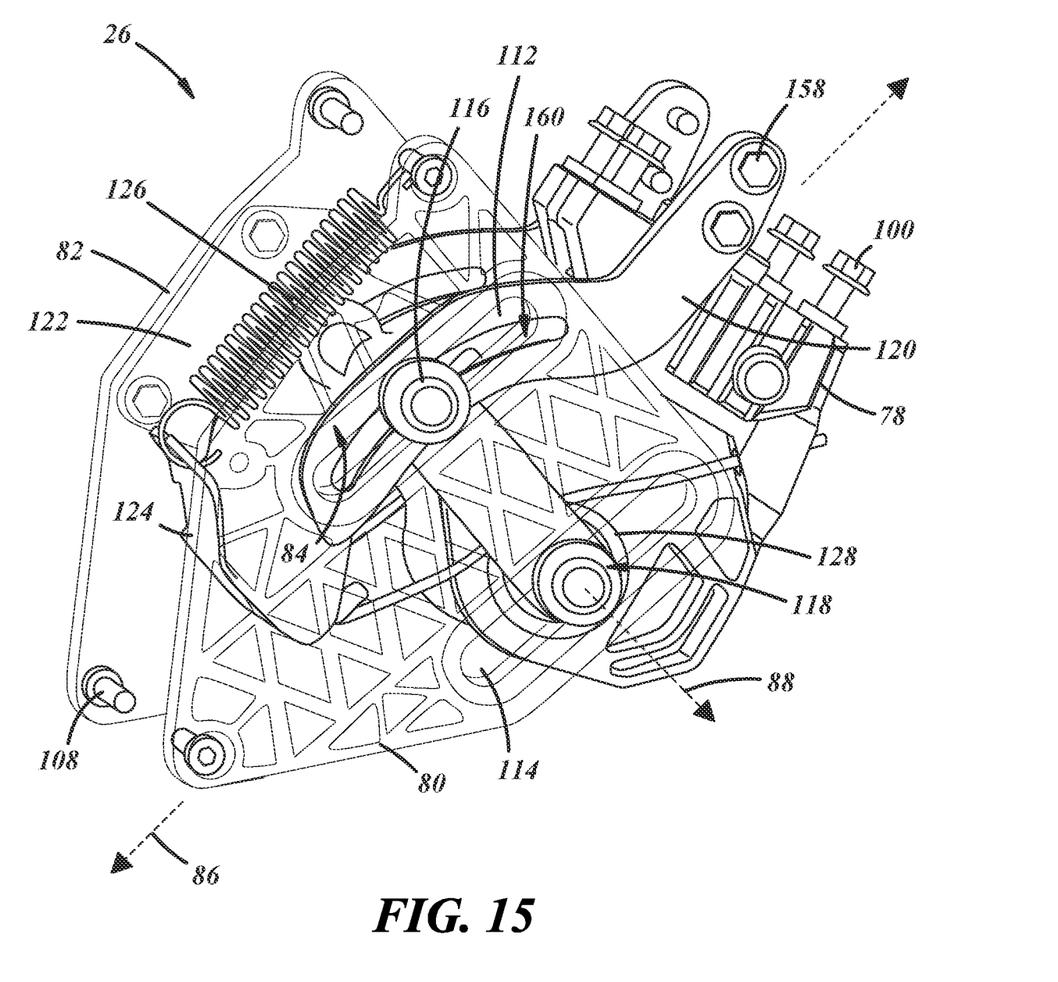
FIG. 15 is a partially transparent perspective view of the apparatus of FIGS. 10-14.

Torsion springs 128 are configured to prevent abrupt movement of steering column 22 about axis 88 and to return body 78 and steering column 22 to a default position about axis 88. Referring to FIG. 15, one end of each spring 126 may be coupled to body 78. Referring to FIG. 16, the other end of each spring 126 may be coupled to body 168 of spring connection plate 124.

Figures 17, 18:
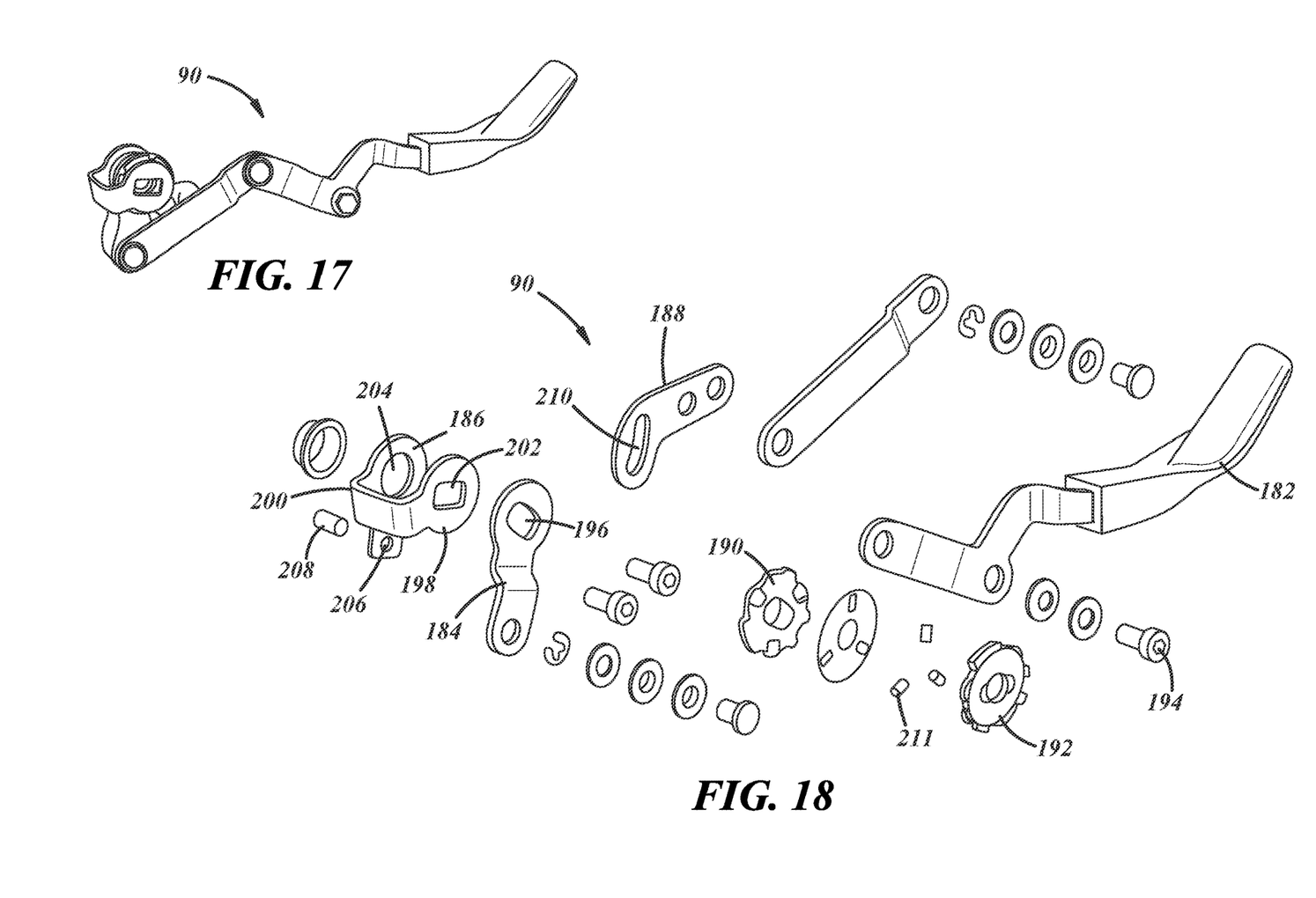
FIGS. 17 and 18 are perspective and exploded views of one embodiment of a position locking assembly for use in the steering assembly of FIGS. 1-2.

Referring now to FIGS. 17-18, position locking assembly 90 provides means for controlling (i.e., preventing or allowing) movement of body 78 and steering column 22 relative to side brackets 80, 82 and vehicle mounting bracket 24. Assembly 90 may include a handle 182, a lever plate 184, a bearing ramp plate positioner 186, a lever positioner 188, bearing ramp plates 190, 192 and respective needle rollers 211. Handle 182 is provided to allow the driver to move body 78 and steering column 22 relative to side brackets 80, 82 and vehicle mounting bracket 24. Referring to FIG. 1, handle 182 may be coupled to body 78 using a conventional fastener 194 such as a screw or bolt. Lever plate 184 is configured to transfer a force exerted by the driver through handle 182 to bearing ramp plates 190, 192. One end of lever plate 184 may be coupled to handle 182 using a conventional fastener. The other end of lever plate 182 defines an opening 196 configured to receive positioning fastener 116 and sleeve 138 and to receive a portion of bearing ramp plate 190 such that bearing ramp plate 190 rotates with lever plate 184. Bearing ramp plate positioner 186 is configured for rotational movement about the axis of positioning fastener 116 and axial movement along the axis of positioning fastener 116 in response to movement of handle 182, lever plate 184, and bearing ramp plates 190, 192. Positioner 186 includes to spaced arms 198, 200 defining aligned openings 202, 204 configured to receive positioning fastener 116 and sleeve 138. Opening 202 is further configured to receive a portion of bearing ramp plate 192 such that positioner 186 rotates with bearing ramp plate 192. Arm 198 of positioner 186 further defines a bore 206 configured to receive a rivet 208 that is also disposed within an arcuate slot 210 of fixed lever positioner 188 thereby restricting rotational movement of positioner 186 to a limited arc. Bearing ramp plates 190, 192 transfer rotational movement of lever plate 184 to bearing ramp plate positioner 186. Bearing ramp plates 190, 192 further include cam surfaces and needle rollers 211 that translate rotational movement of lever plate 184 into axial movement of positioner 186 to move positioner 186 between a lock position preventing movement of body 78 and steering column 22 relative to side brackets 80, 82 and vehicle mounting bracket 24 and a release position permitting movement of body 78 and steering column 22 relative to side brackets 80, 82 and vehicle mounting bracket 24. Movement of handle 182 causes rotation of lever plate 184 and bearing ramp plate 190 relative to bearing ramp plate 192 (needle rollers 211 may be disposed between bearing ramp plates 190, 192 and received within arcuate pockets in bearing ramp plates 190, 192 to permit a limited amount of relative rotation between bearing ramp plates 190, 192). As bearing ramp plate 190 rotates relative to bearing ramp plate 192, cam surfaces on plates 190, 192 cause axial movement of bearing ramp plate 192 relative to bearing ramp plate 190 and corresponding axial movement of positioner 186 to move positioner 186 between a lock position preventing movement of body 78 and steering column 22 relative to side brackets 80, 82 and vehicle mounting bracket 24 and a release position permitting movement of body 78 and steering column 22 relative to side brackets 80, 82 and vehicle mounting bracket 24.

Figure 19:
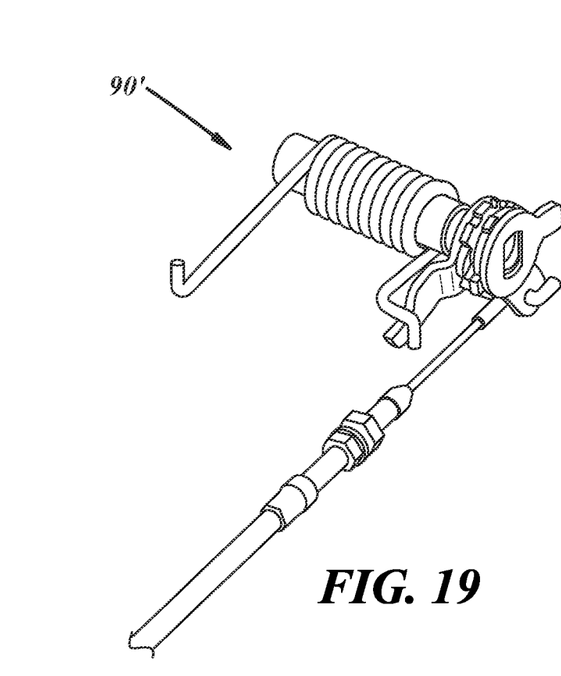
FIGS. 19 and 20 are perspective and exploded views of another embodiment of a position locking assembly for use in the steering assembly of FIGS. 1-2.
Figure 20:
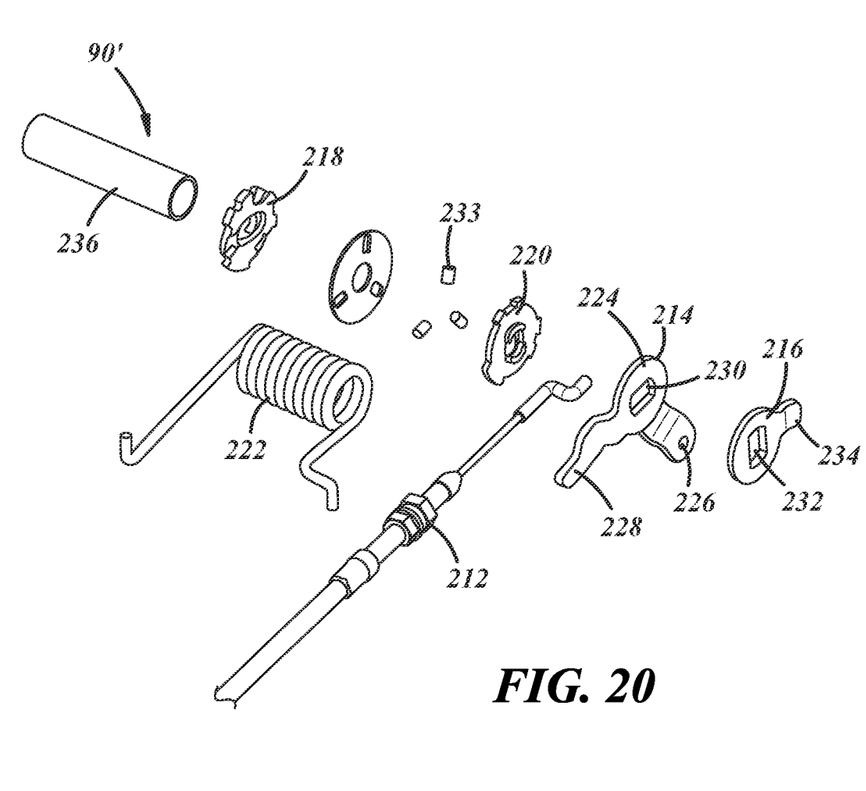

In accordance with one aspect of the teachings disclosed herein, apparatus 26 is configured to work with a variety of different types of position locking assemblies. Referring now to FIGS. 19-20, another embodiment of a position locking assembly 90' is illustrated. Assembly 90' may include a cable 212, a lever plate 214, a bearing plate positioner 216, bearing ramp plates 218, 220, needle rollers 233 and a torsion spring 222. Cable 212 is provided to allow the driver to move body 78 and steering column 22 relative to side brackets 80, 82 and vehicle mounting bracket 24. One end of cable 212 may coupled to a conventional actuator that is movable by the driver to pull cable 212 in one direction. The other end of cable 212 may be coupled to lever plate 214. Lever plate 214 is configured to transfer a force exerted by the driver through cable 212 to bearing ramp plate 218. Lever plate 214 includes a body 224 and arms 226, 228 extending from body 224. Body 224 defines an opening 230 configured to receive positioning fastener 116 and sleeve 138 and to receive a portion of bearing ramp plate 218 such that bearing ramp plate 218 rotates with lever plate 214. Arm 226 is configured for coupling to an end of cable 212. Arm 228 is configured to engage one end of torsion spring 222. Bearing plate positioner 216 is configured for rotational movement about the axis of positioning fastener 116 and axial movement along the axis of positioning fastener 116 in response to movement of cable 212, lever plate 214, and bearing ramp plates 218, 220. Positioner 216 defines an opening 232 configured to receive positioning fastener 116 and sleeve 138 and to receive a portion of bearing ramp plate 220 such that positioner 216 rotates with bearing ramp plate 220. Positioner 216 further define a finger 234 extending radially outward from positioner 216 before bending in an outboard direction. Finger 234 is configured to be received between fingers 178 of spring connection plate 124. Bearing ramp plates 218, 220 transfer rotational movement of lever plate 214 to bearing plate positioner 216. Bearing ramp plates 218, 220 further include cam surfaces and needle rollers 233 that translate rotational movement of lever plate 214 into axial movement of positioner 216 to move finger 234 between fingers 178 of spring connection plate 124 and assembly 90' to a lock position preventing movement of body 78 and steering column 22 relative to side brackets 80, 82 and vehicle mounting bracket 24 or remove finger 234 from between fingers 178 move assembly 90' to a release position to permit movement of body 78 and steering column 22 relative to side brackets 80, 82 and vehicle mounting bracket 24. Spring 222 is provided to return cable 212 to a default position. One end of spring 222 engages arm 228 of lever plate 214 while the other end of spring 222 is coupled to spring connection plate 124 of translation and pivot assembly 84. Spring 222 may be disposed about a tube 236 that may be disposed about tube 144 and positioning fastener 116. Movement of cable 212 causes rotation of lever plate 214 and bearing ramp plate 218 relative to bearing ramp plate 220 (needle rollers 233 may be disposed between bearing ramp plates 218, 220 and received within arcuate pockets in bearing ramp plates 218, 220 to permit a limited amount of relative rotation between bearing ramp plates 218, 220). As bearing ramp plate 218 rotates relative to bearing ramp plate 220, cam surfaces on plates 218, 220 cause axial movement of bearing ramp plate 220 relative to bearing ramp plate 218 and corresponding axial movement of positioner 216 to move positioner 216 between a lock position preventing movement of body 78 and steering column 22 relative to side brackets 80, 82 and vehicle mounting bracket 24 and a release position permitting movement of body 78 and steering column 22 relative to side brackets 80, 82 and vehicle mounting bracket 24

An apparatus 26 for mounting a steering column 22 in a vehicle and a steering assembly 20 for a vehicle in accordance with the present teachings is advantageous relative to conventional vehicle steering systems. The apparatus 26 and assembly 20 enable use of a uniform set of components for mounting a plurality of different steering columns in a plurality of different vehicle mounting configurations thereby reducing design and engineering costs and part count.

While the invention has been shown and described with reference to one or more particular embodiments thereof, it will be understood by those of skill in the art that various changes and modifications can be made without departing from the spirit and scope of the invention. For example, the over molding and clamping technology disclosed herein is not limited to wheel speed sensors, but may also be used for other sensors having similar mounting arrangements including transmission sensors and crankshaft sensors.

What is claimed is:
1. An apparatus for mounting a steering column in a vehicle, comprising:
    a body defining a first interface configured to receive a first plurality of fasteners coupling a steering column mounting bracket to the body in a fixed position, the steering column mounting bracket configured to support the steering column; and, first and second side brackets coupled to either side of the body in a manner permitting translational movement of the body relative to the first and second side brackets along a first axis and rotational movement of the body relative to the first and second side brackets about a second axis, the first and second side brackets defining a second interface configured to receive a second plurality of fasteners coupling a vehicle body mounting bracket to the first and second side brackets.

2. The apparatus of claim 1, further comprising first and second tilt plates, each of said first and second tilt plates having a first end defining a slot configured to receive a positioning fastener extending through the first side bracket, the first tilt plate, the second tilt plate and the second side bracket and a second end and wherein the second end of the first tilt plate and the second end of the second tilt plate define a third interface configured to receive a third plurality of fasteners coupling the steering column mounting bracket and the first and second tilt plates.

3. The apparatus of claim 2 wherein the first plurality of fasteners extend in a direction parallel to a plane containing a rotational axis of the steering column and the third plurality of fasteners extending a direction perpendicular to the plane.

4. The apparatus of claim 2, further comprising a position locking assembly disposed about the positioning fastener and configured to assume a lock position preventing movement of the body relative to the first and second side brackets and a release position permitting movement of the body relative to the first and second side brackets.

5. The apparatus of claim 1 wherein the first plurality of fasteners extend in a direction parallel to a plane containing a rotational axis of the steering column and the second plurality of fasteners extending a direction perpendicular to the plane.

6. The apparatus of claim 1 wherein the second plurality of fasteners comprise first and second upper fasteners extending through the first and second side brackets in opposite directions and disposed about a first common axis and first and second lower fasteners extending through the first and second side brackets in opposite directions and disposed about a second common axis parallel to the first common axis.

7. An apparatus for mounting a steering column in a vehicle, comprising:
a body defining first interface means for interfacing with a steering column mounting bracket to couple the steering column mounting bracket to the body in a fixed position, the steering column mounting bracket configured to support the steering column; and,
first and second side brackets coupled to either side of the body in a manner permitting translational movement of the body relative to the first and second side brackets along a first axis and rotational movement of the body relative to the first and second side brackets about a second axis, the first and second side brackets defining second interface means for interfacing with a vehicle body mounting bracket.

8. The apparatus of claim 7, further comprising first and second tilt plates, each of said first and second tilt plates having a first end defining a slot configured to receive a positioning fastener extending through the first side bracket, the first tilt plate, the second tilt plate and the second side bracket and a second end and wherein the second end of the first title plate and the second end of the second tilt plate define third interface means for interfacing with the steering column mounting bracket.

9. The apparatus of claim 8 wherein the first interface means is configured to receive a first plurality of fasteners coupling the steering column mounting bracket to the body and the third interface means is configured to receive a second plurality of fasteners coupling the steering column mounting bracket to the first and second tilt plates, the first plurality of fasteners extending in a direction parallel to a plane containing a rotational axis of the steering column and the third plurality of fasteners extending a direction perpendicular to the plane.

10. The apparatus of claim 8, further comprising a position locking assembly disposed about the positioning fastener and configured to assume a lock position preventing movement of the body relative to the first and second side brackets and a release position permitting movement of the body relative to the first and second side brackets.

11. The apparatus of claim 7 wherein the first interface means is configured to receive a first plurality of fasteners coupling the steering column mounting bracket to the body and the second interface means is configured to receive a second plurality of fasteners coupling the vehicle body mounting bracket to the first and second side brackets.

12. The apparatus of claim 11 wherein the first plurality of fasteners extend in a direction parallel to a plane containing a rotational axis of the steering column and the second plurality of fasteners extending a direction perpendicular to the plane.

13. The apparatus of claim 11 wherein the second plurality of fasteners comprise first and second upper fasteners extending through the first and second side brackets in opposite directions and disposed about a first common axis and first and second lower fasteners extending through the first and second side brackets in opposite directions and disposed about a second common axis parallel to the first common axis.

14. A steering assembly for a vehicle, comprising:
a steering column mounting bracket configured to support a steering column;
a vehicle body mounting bracket; and
an apparatus for mounting the steering column in the vehicle including
a body defining a first interface configured to receive a first plurality of fasteners coupling the steering column mounting bracket to the body in a fixed position; and,
first and second side brackets coupled to either side of the body in a manner permitting translational movement of the body relative to the first and second side brackets along a first axis and rotational movement of the body relative to the first and second side brackets about a second axis, the first and second side brackets defining a second interface configured to receive a second plurality of fasteners coupling the vehicle body mounting bracket to the first and second side brackets.

15. The steering assembly of claim 14, further comprising first and second tilt plates, each of said first and second tilt plates having a first end defining a slot configured to receive a positioning fastener extending through the first side bracket, the first tilt plate, the second tilt plate and the second side bracket and a second end and wherein the second end of the first tilt plate and the second end of the second tilt plate define a third interface configured to receive a third plurality of fasteners coupling the steering column mounting bracket and the first and second tilt plates.

16. The steering assembly of claim 15 wherein the first plurality of fasteners extend in a direction parallel to a plane containing a rotational axis of the steering column and the third plurality of fasteners extend in a direction perpendicular to the plane.

17. The steering assembly of claim 15, further comprising a position locking assembly disposed about the positioning fastener and configured to assume a lock position preventing movement of the body relative to the first and second side brackets and a release position permitting movement of the body relative to the first and second side brackets.

18. The steering assembly of claim 14 wherein the first plurality of fasteners extend in a direction parallel to a plane containing a rotational axis of the steering column and the second plurality of fasteners extending a direction perpendicular to the plane.

19. The steering assembly of claim 14 wherein the second plurality of fasteners comprise first and second upper fasteners extending through the first and second side brackets in opposite directions and disposed about a first common axis and first and second lower fasteners extending through the first and second side brackets in opposite directions and disposed about a second common axis parallel to the first common axis.

* * * * *

UNITED STATES PATENT AND TRADEMARK OFFICE
CERTIFICATE OF CORRECTION

PATENT NO. : 12,128,947 B1  
APPLICATION NO. : 18/341385  
DATED : October 29, 2024  
INVENTOR(S) : Patki et al.

Page 1 of 1

It is certified that error appears in the above-identified patent and that said Letters Patent is hereby corrected as shown below:

In the Claims

In Column 11, Line 26 Claim 3, the word "in" should appear between the words "extending" and "a".

In Column 11, Line 37 Claim 5, the word "in" should appear between the words "extending" and "a".

In Column 12, Line 12 Claim 9, the word "in" should appear between the words "extending" and "a".

In Column 12, Line 29 Claim 12, the word "in" should appear between the words "extending" and "a".

In Column 13, Line 17 Claim 18, the word "in" should appear between the words "extending" and "a".

Signed and Sealed this  
Twenty-sixth Day of November, 2024

Katherine Kelly Vidal  
*Director of the United States Patent and Trademark Office*